United States Patent
Liang et al.

(10) Patent No.: US 11,671,515 B2
(45) Date of Patent: Jun. 6, 2023

(54) METHODS, NETWORK NODE AND CLIENT DEVICE FOR ACQUISITION AND DELIVERY OF RESOURCES IN A COMMUNICATIONS NETWORK

(71) Applicant: Telefonaktiebolaget LM Ericsson (publ), Stockholm (SE)

(72) Inventors: Hongxin Liang, Upplands Väsby (SE); Keven Wang, Sollentuna (SE); Leonid Mokrushin, Uppsala (SE); Kim Laraqui, Solna (SE); Athanasios Karapantelakis, Stockholm (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 608 days.

(21) Appl. No.: 16/474,277

(22) PCT Filed: Jan. 2, 2017

(86) PCT No.: PCT/EP2017/050027
§ 371 (c)(1),
(2) Date: Jun. 27, 2019

(87) PCT Pub. No.: WO2018/121888
PCT Pub. Date: Jul. 5, 2018

(65) Prior Publication Data
US 2020/0128103 A1  Apr. 23, 2020

(51) Int. Cl.
*H04L 67/63* (2022.01)
*H04L 45/302* (2022.01)
(Continued)

(52) U.S. Cl.
CPC ............ *H04L 67/63* (2022.05); *H04L 45/122* (2013.01); *H04L 45/306* (2013.01); *H04L 45/38* (2013.01);
(Continued)

(58) Field of Classification Search
CPC ...... H04L 45/64; H04L 67/327; H04L 45/122; H04L 67/2842; H04L 45/38;
(Continued)

(56) References Cited

U.S. PATENT DOCUMENTS

| | | | |
|---|---|---|---|
| 2012/0159176 A1* | 6/2012 | Ravindran | ............ H04L 67/327 713/176 |
| 2013/0282920 A1 | 10/2013 | Zhang et al. | |
| 2017/0257284 A1* | 9/2017 | Wood | ..................... H04L 45/302 |

FOREIGN PATENT DOCUMENTS

| | | |
|---|---|---|
| CN | 105100141 A | 11/2015 |
| CN | 105721536 A | 6/2016 |
| CN | 105872008 A | 8/2016 |

OTHER PUBLICATIONS

Westphal, C., Ed., et al., "Adaptive Video Streaming over ICN," draft-irtf-icnrg-videostreaming-08.txt, ICNRG, Internet Draft, Internet Engineering Task Force (IETF) Trust, Apr. 27, 2016, 40 pages.
(Continued)

*Primary Examiner* — Le H Luu
(74) *Attorney, Agent, or Firm* — Withrow & Terranova, PLLC

(57) ABSTRACT

A first network node, a client device and methods therein, for enabling acquisition and delivery of a resource to the client device in a communications network. When receiving from the client device a meta interest request indicating an interest for a wanted resource, the first network node extracts from the meta interest request one or more filter parameters related to desirable characteristics of the wanted resource. The first network node then obtains identifiers of resources available in the communications network, based on the one or more filter parameters, and sends the obtained identifiers of resources to the client device in response to the received meta interest request. Thereby, a user of the client device can see which resources with the desirable characteristics are
(Continued)

available in the network and acquire one of the resources identified in this way, without having to specify the supplier nor the resource in the initial request.

17 Claims, 6 Drawing Sheets

(51) Int. Cl.
*H04L 45/00* (2022.01)
*H04L 45/64* (2022.01)
*H04L 45/745* (2022.01)
*H04L 67/568* (2022.01)
*H04L 45/122* (2022.01)
*H04L 47/125* (2022.01)

(52) U.S. Cl.
CPC ............ *H04L 45/64* (2013.01); *H04L 45/745* (2013.01); *H04L 47/125* (2013.01); *H04L 67/568* (2022.05)

(58) Field of Classification Search
CPC ... H04L 45/306; H04L 45/745; H04L 47/125; H04L 67/568; H04L 67/63
See application file for complete search history.

(56) References Cited

OTHER PUBLICATIONS

Wissingh, B., et al., "Information-Centric Networking: Terminology," draft-wissingh-isnrg-terminology-00, ICNRG, Intenet-Draft, Internet Engineering Task Force (IETF) Trust, Jul. 8, 2016, 11 pages.
International Search Report and Written Opinion for International Patent Application No. PCT/EP2017/050027, dated Sep. 7, 2017, 9 pages.
Wissingh, et al., "Information-Centric Networking (ICN): Terminology," Request for Coments, Mar. 2017, tools.ietf.org/id/draft-wissingh-icnrg-terminology-01.xml, 13 pages.
Examination Report for European Patent Application No. 17700479.3, dated Feb. 15, 2021, 6 pages.
First Office Action for Chinese Patent Application No. 201780081630.8, dated Aug. 4, 2021, 15 pages.
Second Office Action for Chinese Patent Application No. 201780081630.8, dated May 7, 2022, 14 pages.
Cruz et al., "Peer-to-Peer Streaming Tracker Protocol (PPSTP)," Request for Comments 7846, May 2016, Internet Engineering Task Force, 55 pages.
Examination Report for European Patent Application No. 17700479.3, dated Oct. 7, 2021, 6 pages.

* cited by examiner

METHODS, NETWORK NODE AND CLIENT DEVICE FOR ACQUISITION AND DELIVERY OF RESOURCES IN A COMMUNICATIONS NETWORK

This application is a 35 U.S.C. § 371 national phase filing of International Application No. PCT/EP2017/050027, filed Jan. 2, 2017, the disclosure of which is incorporated herein by reference in its entirety.

TECHNICAL FIELD

The present disclosure relates generally to a first network node, a client device and methods therein, for enabling acquisition and delivery of a resource to the client device in a communications network.

BACKGROUND

In recent years, it has become increasingly common that electronic media is streamed or downloaded from content providers to client devices over communications networks such as the Internet, resulting in a huge increase of data traffic across various networks and communication links. Users can nowadays be seen everywhere consuming electronic media with their communication devices, e.g. by watching web pages and movies and listening to music and other audio content. There is thus a constant need for more capacity in the networks to serve more users and provide better bitrates, quality and coverage to meet the demands from the users. Further, increasingly advanced client devices are used for communication of electronic media, such as smartphones and tablets with high screen resolution, which often require considerable amounts of bandwidth and resources for data transport in the networks to satisfy the increasingly fastidious users.

In this disclosure, the term "electronic media" is used to represent any content that can be streamed or downloaded over a communications network and played out on a client device, such as music, text, images, documents, movies, videos, animations, web pages, and so forth. Alternatively, the term "content" could be used instead of media throughout this disclosure. Further, the term "client device" is used herein representing any user-operated communication apparatus that can receive and play out streamed or downloaded electronic media. Alternatively, the term "user terminal" or the term "User Equipment, UE" could be used instead of client device throughout this disclosure.

The networks that are used for transporting all this data are collectively referred to as the Internet which in reality is comprised of numerous individual networks, nodes and links which are interconnected such that media can be transported from any content provider to any client device, wherever they are located. FIG. 1 schematically illustrates an example of different access networks 100, including network 1, network 2, network 3 and network 4, being connected to one another, and where different content providers 102 can be reached from each respective access network. Each access network 100 comprises various communication links, switches and routers which are schematically indicated by lines and boxes. In this example, a client device 104 is connected to access network 3 and may download some selected electronic media from one of the content providers 102. The downloaded electronic media is then transported from the content provider across various networks and links to finally reach the client device 104 for playout.

Traditionally, electronic media is acquired by sending a request to a specific content provider, the request identifying a wanted media resource such as a movie or a piece of music, as illustrative examples. The content provider then sends the requested media, e.g. by streaming or downloading depending on the service used, to the requesting party which is thus referred to herein as the client device. This is thus an end-to-end communication of data which may involve and consume considerable amounts of network resources, typically involving a huge number of links, switches, routers and networks along the transportation path.

Recently, it has been discussed how the communication of electronic media can be made more efficient and require less network resources by means of a new type of media or content networking referred to as "Information-Centric networking", ICN, where only the electronic media needs to be identified in the request, without having to address the request to a particular content provider. In this case the process of acquiring electronic media is based on named data rather than numerically addressed hosts such as content providers. The underlying principle is that a communication network should allow a user to focus on the data he or she wants, as named electronic media, rather than having to reference a specific, physical location where that data is to be retrieved from. The concept of "Named Data Network", NDN, has also been introduced in this field which basically represents any communications network that is capable of routing and delivering electronic media in response to a request that merely identifies the requested electronic media but without addressing a content provider. An example of how electronic media may be acquired in an NDN network operating according to ICN, will now be described in more detail with reference to FIG. 1A.

In this context, acquiring electronic media basically involves two types of packets referred to as the Interest packet and the Data packet which may be used in the above NDN as illustrated in FIG. 1A. The Interest packet 110 corresponds to a media request and only a name of the wanted electronic media needs to be specified therein. In short, the user of a client device 104 just enters the name of a desired piece of electronic media, i.e. data, which is then included in an Interest packet 110 and sends the Interest packet 110 to the NDN network 106. Routers and nodes in the NDN network 106 use this name to forward the Interest packet toward a node that has the requested data, in this example named data provider 108. A commonly used structure of the Interest packet 110 is shown in FIG. 1A.

It is assumed that nodes in the NDN network 106 employ extensive caching of electronic media and the requested data may be available in an intermediate node such that the Interest packet does not have to propagate all the way to the original content provider. The data provider 108 may thus be such an intermediate node having the requested data cached, or it may the original content provider or "data producer". Once the Interest packet 110 reaches a node that has the requested data, i.e. the data provider 108, the node 108 will return a Data packet 112 that contains both the name and the data, here referred to as Content, as well as some meta information and a signature. This Data packet 112 follows in reverse the path taken by the Interest packet 110 to get back to the requesting client device 104. A commonly used structure of the Data packet 112 is also shown in FIG. 1.

The above usage of interest and data packets assumes that the user always knows what electronic media to ask for, including its name or corresponding identification. However, sometimes the user is not able or willing to identify a specific piece of electronic media, e.g. when not being aware of what is available and can be requested, or when not wanting a specific piece of electronic media, or when not knowing the name of a wanted piece of electronic media. Although it may be possible to contact a content provider to find out what to ask for, such a procedure can be time-consuming and tedious for the user, also consuming network resources and power before a wanted electronic media has even been identified.

SUMMARY

It is an object of embodiments described herein to address at least some of the problems and issues outlined above. It is possible to achieve this object and others by using a first network node, a client device and methods therein as defined in the attached independent claims.

According to one aspect, a method is performed by a first network node for enabling acquisition and delivery of a resource to a client device in a communications network. In this method, the first network node receives from the client device a meta interest request indicating an interest for a wanted resource that can be acquired over the communications network. The first network node then extracts from the meta interest request one or more filter parameters related to desirable characteristics of the wanted resource. The first network node further obtains identifiers of resources available in the communications network, based on the one or more filter parameters, and sends the obtained identifiers of resources to the client device in response to the received meta interest request.

Thereby, a user of the client device can find out which resources with the desirable characteristics are available in the network and acquire one of the resources identified by the sent identifiers. Among other things it is an advantage that it is not necessary that any supplier or specific resource is specified in the received request. The user just needs to specify the desirable characteristics that can be translated into the one or more filter parameters for inclusion in the meta interest request.

According to another aspect, a first network node is arranged to enable acquisition and delivery of a resource to a client device in a communications network. The first network node is configured to receive from the client device a meta interest request indicating an interest for a wanted resource that can be acquired over the communications network, and to extract from the meta interest request one or more filter parameters related to desirable characteristics of the wanted resource. The first network node is further configured to obtain identifiers of resources available in the communications network, based on the one or more filter parameters, and to send the obtained identifiers of resources to the client device in response to the received meta interest request.

According to another aspect, a method is performed by a client device for enabling acquisition of a resource from one or more network nodes in a communications network. In this method the client device sends to a first network node a meta interest request indicating an interest for a wanted resource that can be acquired over the communications network, the meta interest request comprising one or more filter parameters related to desirable characteristics of the wanted resource. In response to the sent meta interest request, the client device receives from the first network node identifiers of resources that match the one or more filter parameters.

Thereby, the client device can indicate on its screen which resources are available in the network, based on the received identifiers of resources, so that the user is able to acquire one or more of the displayed resources, e.g. by downloading or by streaming.

According to another aspect, a client device is arranged to enable acquisition of a resource from one or more network nodes in a communications network. The client device is configured to send to a first network node a meta interest request indicating an interest for a wanted resource that can be acquired over the communications network, the meta interest request comprising one or more filter parameters related to desirable characteristics of the wanted resource. The client device is also configured to receive from the first network node identifiers of resources that match the one or more filter parameters, in response to the sent meta interest request.

The above methods, first network node and client device may be configured and implemented according to different optional embodiments to accomplish further features and benefits, to be described below. For example, the above-mentioned communications network may be a Named Data Network, NDN, configured to employ Information-Centric networking, ICN. Further, the communications network may be part of the Internet, or it may be a more limited type of network such as a Wide Area Network WAN or a Local Area Network LAN. The embodiments described herein may thus be employed in a public network or in a private or corporate network, and the solution is not limited in this respect.

A computer program is also provided comprising instructions which, when executed on at least one processor, cause the at least one processor to carry out either of the methods described above. A carrier is further provided that contains the above computer program, wherein the carrier comprises one of an electronic signal, optical signal, radio signal or computer readable storage medium.

BRIEF DESCRIPTION OF DRAWINGS

The solution will now be described in more detail by means of exemplary embodiments and with reference to the accompanying drawings, in which.

DETAILED DESCRIPTION

Figure 1:
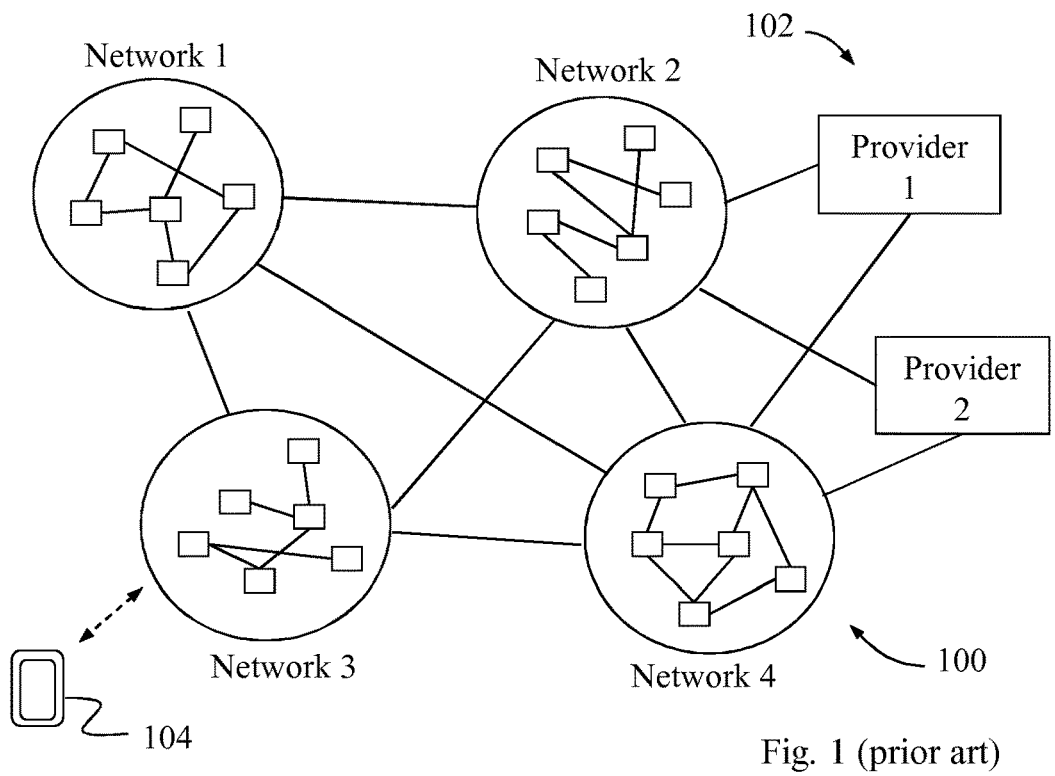
FIG. 1 is a communication scenario illustrating how electronic media can be acquired and delivered by means of various communications networks, according to the prior art.
Figure 1A:
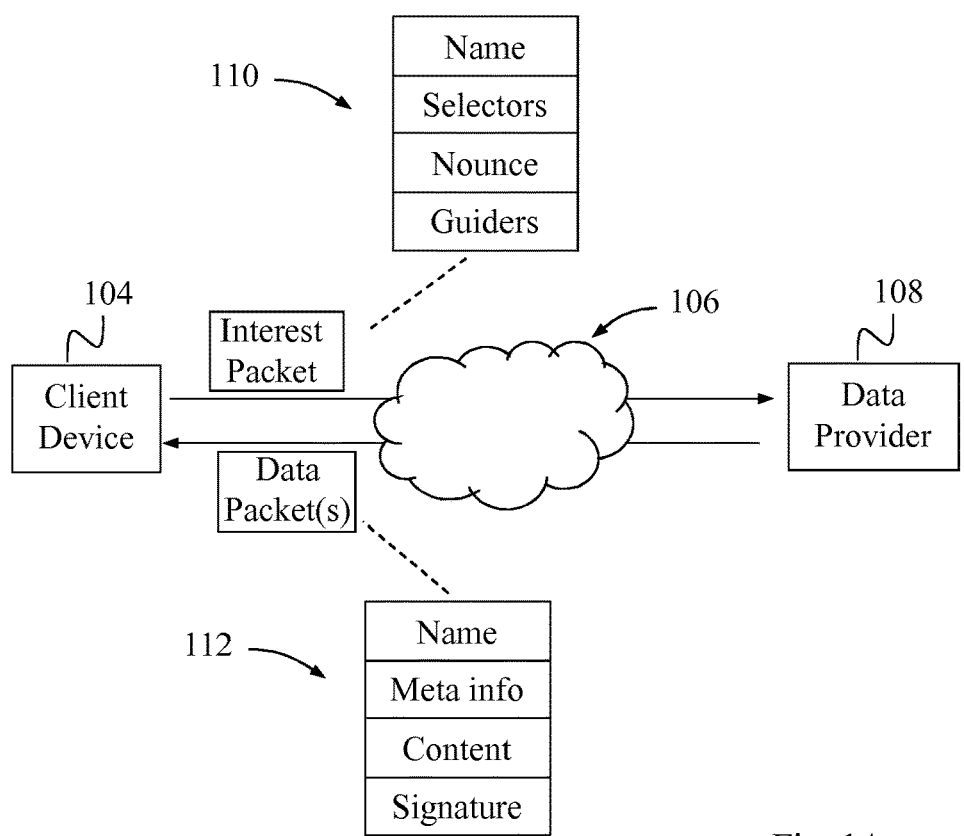
FIG. 1A illustrates how a client device can acquire electronic media by sending an interest packet over a Named Data Network, NDN, according to the prior art.

Briefly described, a solution is provided to enable acquisition and delivery of a resource to a client device in a communications network such as an NDN network in which the above-described ICN is employed. In particular, this solution can be useful when the resource is not known or specified by the client device, i.e. when it is not possible to include its name or other identity in a resource request that is sent from the client device to the communications network. The solution may further be used when a user of the client device does not desire a specific resource, but just wants to acquire any resource that has certain characteristics which may be fulfilled by a number of resources that are available in the network.

In an illustrative but non-limiting example, the user may want to acquire a movie with the characteristics of a particular genre and a certain language and country of production. This solution makes it possible for the user to get information about a number of movies that fulfill the above characteristics and are available from the network, e.g. by means of downloading or streaming. In another non-limiting example, the user may want to acquire a network resource such as a data storage or a processor function, e.g. similar to what is known as cloud computing. In this case a network resource may have characteristics related to processing capacity storing capacity or link capacity, among other things. This solution makes it possible for the user to get knowledge about a number of network resources that fulfill the above characteristics and are available from the network, e.g. in the manner of a cloud service or the like. In this description, the term "a network resource" may refer to any number of individual network resources and typically a set of network resources may be desired to be used for data processing, storing and/or communication.

In this description the term "resource" is thus used to represent any of electronic media and one or more network resources. Electronic media may be acquired by downloading or streaming while a network resource may be acquired by utilizing a processor, a data storage or a communication link provided by one or more network nodes. Even though the following examples refer to "a resource" they may apply to one or more individual resources.

The above-described objectives and advantages can be achieved by employing a new type of request, referred to as a "meta interest request" which the client device can create and send to a first network node of a communications network. This meta interest request effectively indicates an interest for a wanted resource by including one or more filter parameters related to desirable characteristics of the wanted resource. The first network node then obtains identifiers of any available resources that match the one or more filter parameters in the request and returns the resource identifiers to the client device. The response returned to the client device may thus contain a list with identifiers of any number of resources that are available in the network, so that the user is able to choose a resource from the list and acquire the chosen resource.

In this process, the first network node may find one or more matching resources that are available from the first network node itself, and may also forward the meta interest request to one or more further network nodes in which matching resources might be available. The meta interest request may be propagated in this way from network node to network node a number of hops through the network until a useful result is obtained that can be returned to the client device. The further network nodes will thus return to the first network node identifiers of matching resources that are cached in the respective network nodes, basically taking the same route as the request in reverse. The number of hops may be set by default or be specified in the meta interest request. The number of hops may alternatively be calculated e.g. based on current traffic load, type of resource, and type of requesting client device.

This way, the user can get knowledge about which resources are available in the network and select any of them for acquisition from the network node where it is available. It is thus an advantage that the user is not required to know and specify which specific resource to ask for and from which supplier such as a content provider or other resource supplier.

An example of how this solution could be used in a practical communication scenario will now be described with reference to FIG. 2, which illustrates how a first network node 200 and a client device 202 may operate when the solution is employed in a communications network 204. A first action 2:1 indicates that the client device 202 sends to the first network node 200 a meta interest request indicating an interest for a wanted resource that can be acquired over the communications network. When receiving the meta interest request, the first network node 200 extracts one or more filter parameters therefrom, which are related to desirable characteristics of the wanted resource, in an action 2:2. The filter parameters can then be used for finding any resource(s) that matches the filter parameters and thereby fulfils the desirable characteristics.

In this example, the first network node 200 also propagates the meta interest request further in the network 204 by forwarding it to a second network node 206, in another action 2:3. The second network node 206 may then likewise process the meta interest request in the same manner as the first network node 200 did in action 2:2, including checking its own cache and possibly forwarding the meta interest to further network nodes 208. As mentioned above, the meta interest request may be propagated from network node to network node a number of hops which may be set as a parameter herein referred to as the maximum number of hops.

Figure 2:
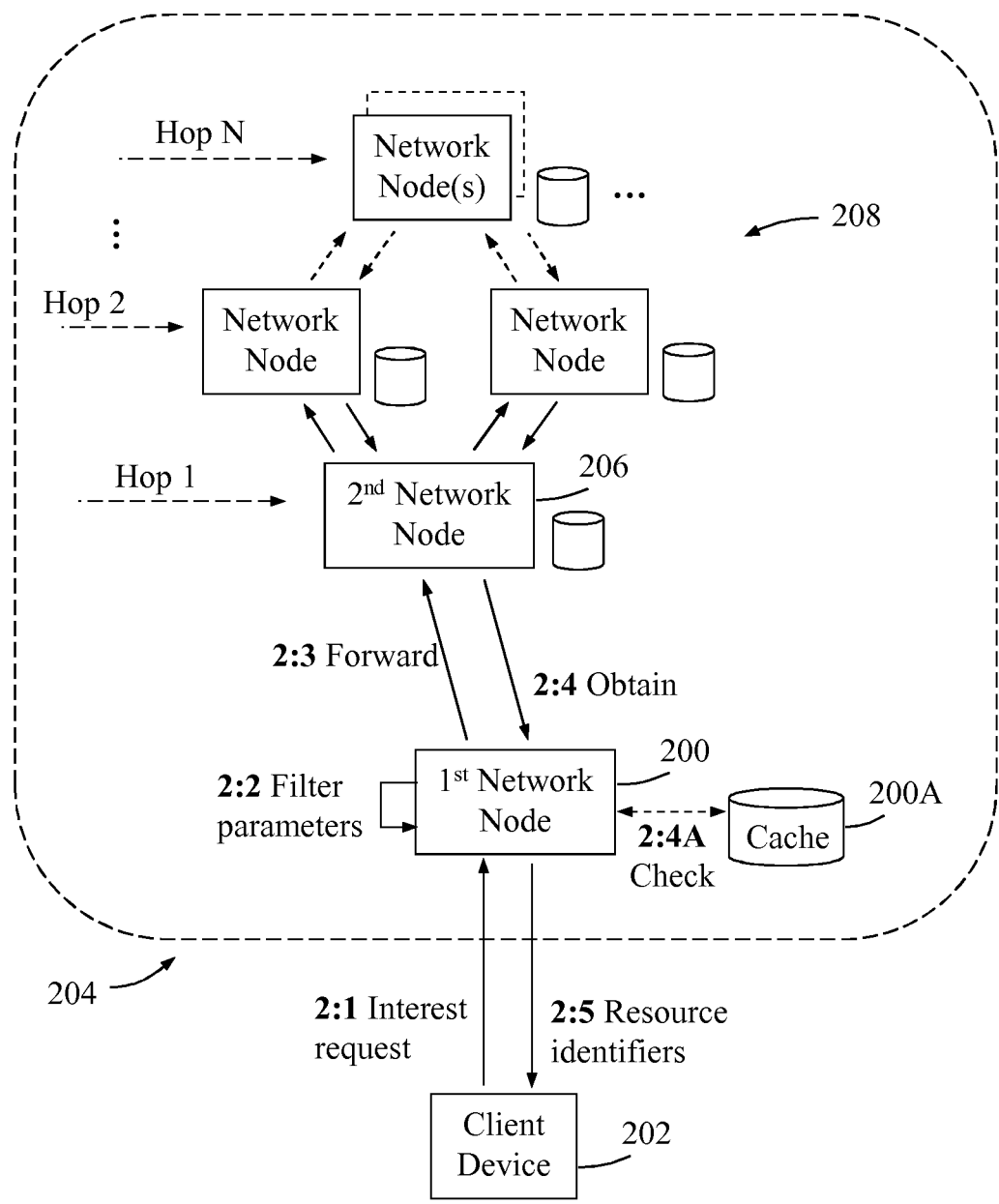
FIG. 2 is a communication scenario illustrating an example of how the solution may be employed, according to some possible embodiments.

FIG. 2 illustrates that the first network node 200 initially propagates the meta interest request to the second network node 206 in a first hop, Hop 1, and the second network node 206 then propagates the meta interest request to one or more further network nodes 208 in a second hop, Hop 2, and so forth. In this example, the maximum number of hops is set to a number N at which level the propagation stops. It should be noted that each network node 200, 206, 208 may forward the meta interest request to more than one further network node, depending on the topology or structure of the communications network 204, so that the number of involved network nodes may be correspondingly multiplied for each hop.

Each network node that finds one or more matching resources will also return their results including corresponding identifiers of the found resources, e.g. in the form of a list with resource identifiers, to the foregoing network node from which the meta interest request was received. This network node will likewise add to the received list any identifiers of matching resources found in its own cache before sending the list to the next foregoing network node, and so forth, until the accumulated list reaches the first network node 200. The resource identifiers are thus propagated back to the first network node 200 the same route as the meta interest request was propagated but in a reverse direction. The above list will also contain an identification, such as a network address, of the network node from which the respective resource can be acquired.

This way, the list with identifiers of matching resources is built up and finally reaches the first network node 200, as shown in an action 2:4, which means that the first network node 200 effectively obtains identifiers of resources available in the communications network 204, based on the one or more filter parameters in the meta interest request. Obtaining the identifiers of resources may also include that the first network node 200 checks its own cache 200A, in an action 2:4A, to see if there are any resources therein that matches the filter parameters. If so, the matching resource(s) will be added to the list with resource identifiers. Finally, the first network node 200 sends the accumulated and completed list of resource identifiers to the client device 202 in an action 2:5, as a response to the request received in action 2:1.

If the above-described parameter maximum number of hops N is applied in this procedure, the parameter N will be included in the propagated the meta interest request. As mentioned above, N may in a non-limiting example already be included in the initial request of action 2:1, or it may in another non-limiting example be added by the first network node 200 before forwarding the request to the second network node 206. For each hop, N will be reduced by one before forwarding the request in the next hop. When a network node receives the meta interest request in which N=0, which indicates that the maximum number of hops has been reached, that network node will not forward the request any further. Alternatively, a number of so far executed hops may be incremented in the request for each hop, until it reaches the maximum hop number N, which indicates that the maximum number of hops has been reached and the forwarding should be stopped. In this way, the propagation of the meta interest request across the network 204 can be restricted by applying the parameter maximum number of hops N.

An example will now be described, with reference to the flow chart in FIG. 3, of how the solution can be employed in terms of actions which may be performed in a first network node, such as the above-described first network node 200, for enabling acquisition and delivery of a resource to a client device in a communications network. Reference will sometimes also be made, without limiting the features described, to the example shown in FIG. 2. The procedure illustrated by FIG. 3 can thus be used to accomplish the functionality described above for the first network node 200 for enabling acquisition and delivery of a resource to the client device 202 in the communications network 204.

In some non-limiting examples, the first network node 200 may be implemented in a radio base station, a router, a gateway, or in any other suitable node of the network that could be capable of acting as described herein. Some example embodiments of the following procedure will also be described below.

A first action 300 illustrates that the first network node 200 receives from the client device 202 a meta interest request indicating an interest for a wanted resource that can be acquired over the communications network. This action corresponds to action 2:1 in FIG. 2. In this disclosure, the term "wanted resource" should be understood as a resource that is desired without specifying or identifying a specific individual resource. Further, a wanted resource may in this context refer to any number of resources and the solution is not limited to a single resource. In a next action 302, the first network node 200 extracts from the received meta interest request one or more filter parameters which are related to desirable characteristics of the wanted resource, which corresponds to action 2:2 in FIG. 2.

In a further action 304, the first network node 200 obtains identifiers of resources available in the communications network, based on the one or more filter parameters. It was described above with reference to actions 2:3-2:4 that such identifiers of resources may be obtained by forwarding the meta interest request to one or more other network node 206, 208 which in turn may have cached one or more resources that match the desirable characteristics. If the wanted resources include electronic media, another optional action 306 indicates that the first network node 200 itself may obtain at least some of the identifiers of resources from a cache 200A of the first network node 200, if there are any such electronic media in the cache 200A matching the desirable characteristics.

A final action 308 illustrates that the first network node 200 sends the obtained identifiers of resources to the client device 202 in response to the received meta interest request. Thereby, the client device 202 is able to present to its user any resources that are available in the network and matching the meta interest request, based on the received identifiers of resources. The user may then select and download or stream a preferred one of the presented resources for playout on the client device 202, which is however beyond the scope of this procedure.

Figure 3:
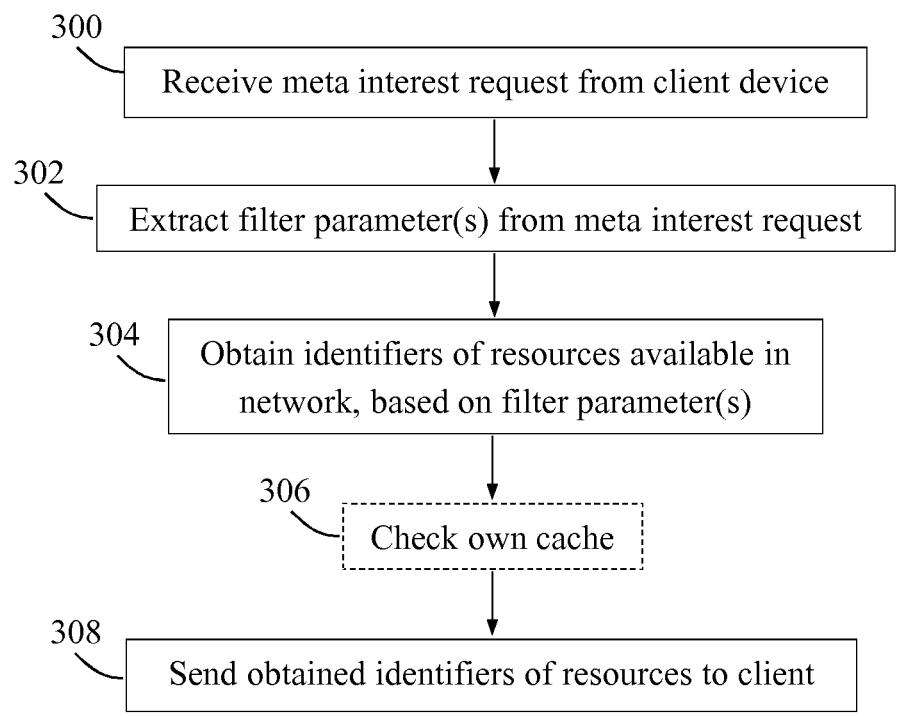
FIG. 3 is a flow chart illustrating a procedure in a first network node, according to further possible embodiments.

Some further embodiments and examples of how the above procedure in FIG. 3 may be realized will now be outlined. In one example embodiment, obtaining the identifiers of resources may comprise forwarding the received meta interest request to at least one second network node 206, 208 and receiving from the at least one second network node 206, 208 one or more of said identifiers of resources.

In some further example embodiments, the at least one second network node 206, 208 may be determined based on a maximum number of hops indicated in the meta interest request or based on a predefined default maximum number of hops. In one an alternative example embodiment, the at least one second network node 206, 208 could instead be determined based on a maximum number of hops which is set based on any of: current load on the communications network, type the wanted resource, and type of said client device 202.

In another example embodiment, the meta interest request may have a reserved name indicating that it is a meta interest request and that it should be forwarded to the at least one second network node 206, 208. Such a reserved name of the meta interest request will thus inform the receiving network node that the request is not a conventional request for a specific identified resource, and that it should be processed as described herein.

In some further example embodiments, the wanted resource may comprise electronic media and in that case the one or more filter parameters may indicate one or more of: content provider, type of media, format or resolution, genre, country of origin, cost for acquisition, and playback duration. If the wanted resource comprises electronic media, another example embodiment may be, as indicated above, that obtaining the identifiers of resources comprises checking whether any electronic media in a cache 200A of the first network node 200 matches the one or more filter parameters.

In some further example embodiments, instead of electronic media the wanted resource may comprise a network resource and the one or more filter parameters may in that case indicate one or more of: network resource provider, type of network resource, performance, and duration of access to the network resource. As mentioned above, the term "a network resource" should be understood as one or more network resources.

In another example embodiment, the communications network 204 may be a Named Data Network, NDN, employing Information-Centric networking, ICN.

An example will now be described, with reference to the flow chart in FIG. 4, of how the solution can be employed in terms of actions which may be performed in a client device, such as the above-described client device 202, for enabling acquisition of a resource from one or more network nodes in a communications network. Reference will likewise also be made, without limiting the features described, to the example shown in FIG. 2. The procedure illustrated by FIG. 4 can thus be used to accomplish the functionality described above for the client device 202 for enabling acquisition of a resource from the one or more network nodes 200, 206, 208 in the communications network 204. In some further non-limiting examples, the client device 202 may be any of: a mobile phone, a smartphone, a tablet, a computer, a Set Top Box, a television set, a streaming device, or any other suitable communication device that could be capable of acting as described herein.

An optional first action 400 illustrates that the client device 202 may set or define the above-described filter parameters in response to some input that a user has entered e.g. to an application or the like running in the device 202. For example, the application may prompt the user to specify one or more characteristics describing a resource that the user wants to search for and acquire, e.g. without knowing exactly which resource to search for. The user may only know more or less vaguely how he/she wants the resource to be like which could be described in terms of characteristics, referred to herein as the "desirable characteristics of the wanted resource".

Some illustrative but non-limiting characteristics that a user could specify in action 400 when wanting to acquire a movie may include genre, approximate duration, High-Definition resolution, maximum price and language, which could easily be translated into filter parameters. Further, it may also be possible for the user to specify a priority of the characteristics e.g. to indicate that some characteristics may be more important to the user than others. The client device 202 could then set or define the above-described filter parameters in a meta interest request based on the characteristics specified by the user. Another option may be that in case some characteristic is not specified by the user or application, the client device 202 may set a corresponding filter parameter by default in the meta interest request, or that filter parameter may simply be omitted in the meta interest request. For example, if no duration has been specified for a wanted movie, a duration interval of 1-2 hours may be set as a default filter parameter, or the meta interest request may be unrestricted with respect to duration of the movie.

In a next action 402, the client device 202 sends to a first network node 200 the meta interest request which thus indicates an interest for a wanted resource that can be acquired over the communications network, the meta interest request comprising one or more filter parameters related to desirable characteristics of the wanted resource. This action corresponds to action 2:1 in FIG. 2. After this action, the first network node 200 basically perform the procedure described above for FIG. 3 and return a response to the client device 202.

A next action 404 illustrates that the client device 202 accordingly receives from the first network node 200 identifiers of resources that match the one or more filter parameters, in response to the sent meta interest request, which corresponds to action 2:5 in FIG. 2. An optional further action 406 illustrates that the client device 202 may indicate on its screen which resources are available in the network, based on the received identifiers of resources, thereby enabling the user to acquire one or more of the displayed resources, e.g. by downloading or by streaming.

Figure 4:
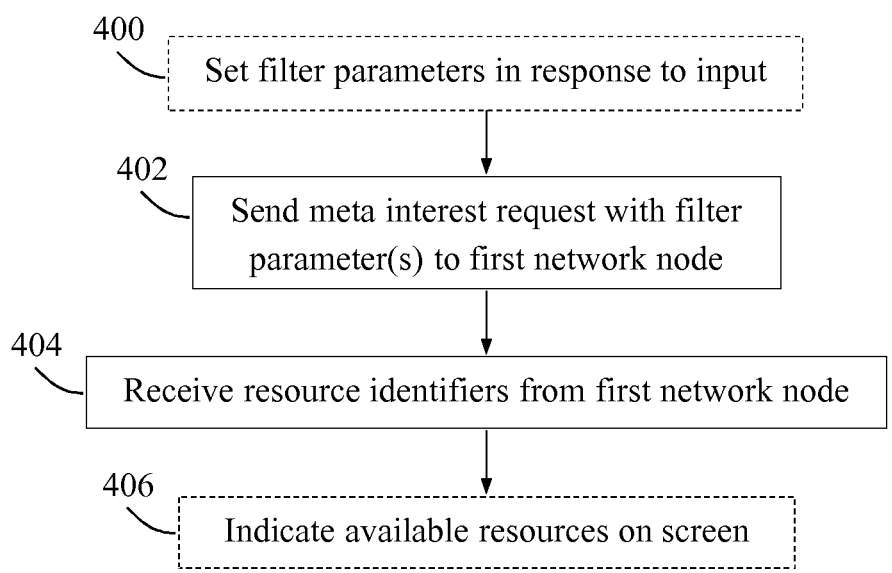
FIG. 4 is a flow chart illustrating a procedure in a client device, according to further possible embodiments.

Some further embodiments and examples of how the above procedure in FIG. 4 may be realized will now be outlined. In one example embodiment, the one or more filter parameters may be set in response to input received from a user or from an application in the client device 202, which was described above for action 400. In another example embodiment, the meta interest request may be sent to the first network node 200 when triggered by the user or by the application. For example, the user may press a button or the like, or the application may generate a suitable triggering signal or the like to initiate the above action 402.

In some further example embodiments, the wanted resource may comprise electronic media and in that case the one or more filter parameters may indicate one or more of: content provider, type of media, format or resolution, genre, country of origin, cost for acquisition, and playback duration. In some further example embodiments, instead of electronic media, the wanted resource may comprise a network resource and in that case the one or more filter parameters may indicate one or more of: network resource provider, type of network resource, performance, and duration of access to the network resource.

Figure 5:
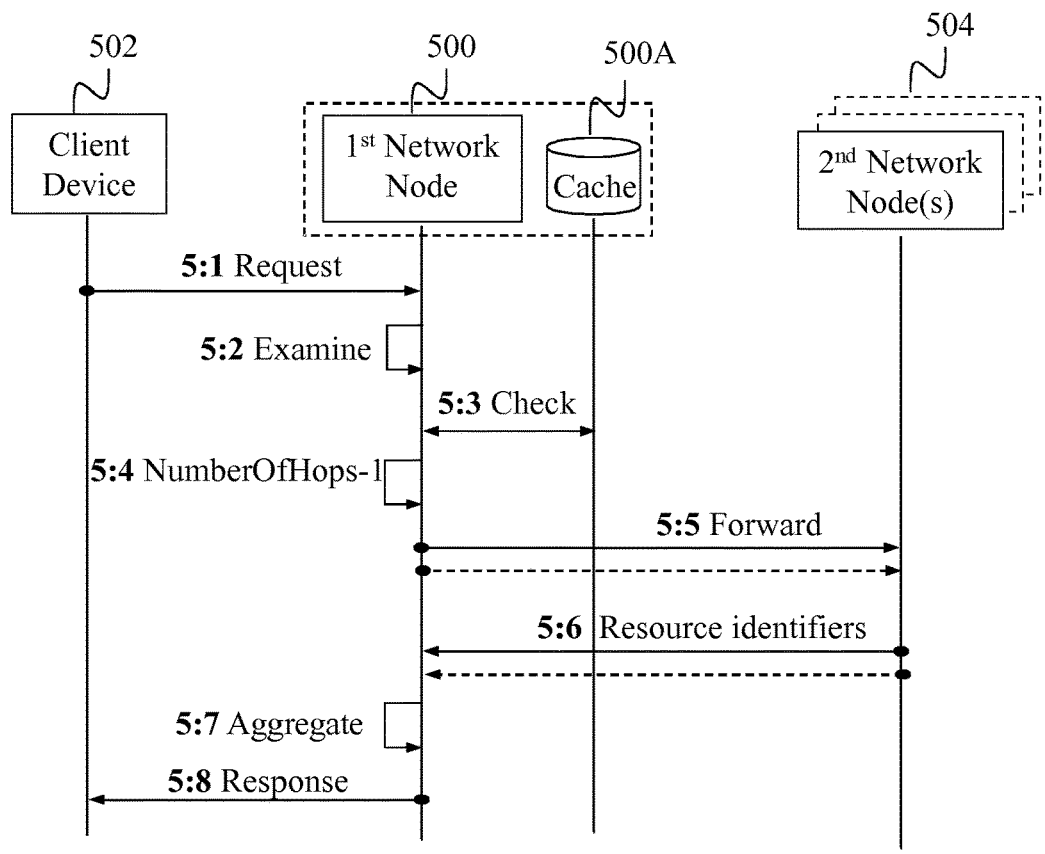
FIG. 5 is a signaling diagram illustrating an example of a procedure when the solution is used, according to further possible embodiments.

Another example of a communication where at least some of the above described embodiments are employed, will now be described with reference to the signalling diagram of FIG. 5, involving a first network node 500, a client device 502 and one or more second network nodes 504 in a communications network. In a first action 5:1, the client device 502 sends a meta interest request to the first network node 500, which request includes the above-described parameter N that indicates a maximum number of hops. The first network node 500 examines the request in a next action 5:2, thereby finding that the request is meta interest request that should be propagated across the network, e.g. based on a specific reserved name of the request. This action also includes extracting the above-described filter parameters from the request.

In a further action 5:3, the first network node 500 checks if there are any resources in its own cache 500A that match the filter parameters. A further action 5:4 illustrates that the first network node 500 reduces the parameter N in the request by one, i.e. N−1. The first network node 500 then forwards the meta interest request to the one or more second network nodes 504, which request includes the reduced parameter N−1, in another action 5:5. This action corresponds to action 2:3 in FIG. 2. The number of second network nodes 504 is dependent on the parameter N.

In response to the meta interest request, the one or more second network nodes 504 returns identifiers of matching resources and their network node identifications to the first network node 200, in another action 5:6 which basically corresponds to action 2:4 in FIG. 2. Having obtained all identifiers of matching resources from the one or more second network nodes 504, the first network node 200 creates an aggregated list containing the obtained identifiers of matching resources and corresponding network node identifications, in an action 5:7. The first network node 200 finally sends the aggregated list to the client device 502 in a final action 5:8. It should be noted that if a particular network resource is cached at more than one network node, the list may specify all network resources from which the network resource is available, or just one of these network resource such as the one that is located closest to the first network node 502, so as to limit the size of the list.

Figure 6:
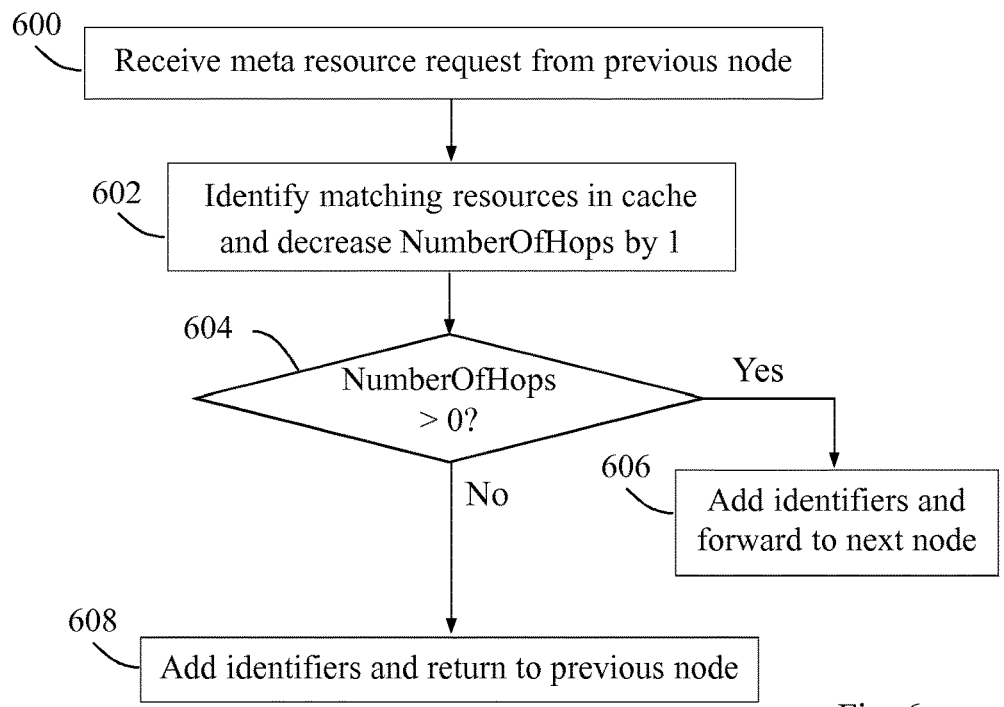
FIG. 6 is a flow chart illustrating another example of a procedure in a network node, according to further possible embodiments.

An example of how a network node may operate when the above-described parameter maximum number of hops N is employed in the procedure described herein, will now be briefly outlined with reference to the flow chart in FIG. 6. The network node in this example may be any of the network nodes 200 206, 208, 500 and 504. In a first action 600, the network node receives the above-described meta interest request when forwarded from a previous network node, the meta interest request indicating how many hops remains to be executed in the forwarding procedure, here referred to as "NumberOfHops". In this example, this is indicated by decreasing the parameter N in the request by one for each hop before forwarding the request to the next node(s). Alternatively, it may be indicated by incrementing the number of so far executed hops in the request by one for each hop. The meta interest request also contains a list with identifies of matching resources found so far in previous network nodes.

In a next action 602, the network node identifies any resources in its own cache that match the filter parameters in the request, and also decreases the parameter N in the request by one. It is then checked in an action 604 whether the reduced NumberOfHops is greater than zero or not. If so, the network node adds identifiers of any matching resources in its own cache to the list and forwards the meta interest request with the updated list and decreased NumberOfHops to a next node, in an action 606. If NumberOfHops is zero in action 604, the network node concludes that the maximum number of hops N has been reached and that no further forwarding shall be made. Accordingly, the network node adds the identifiers of matching resources in its own cache to the list and returns the list to the foregoing network node from which the request was received, in an action 608.

Figure 7:
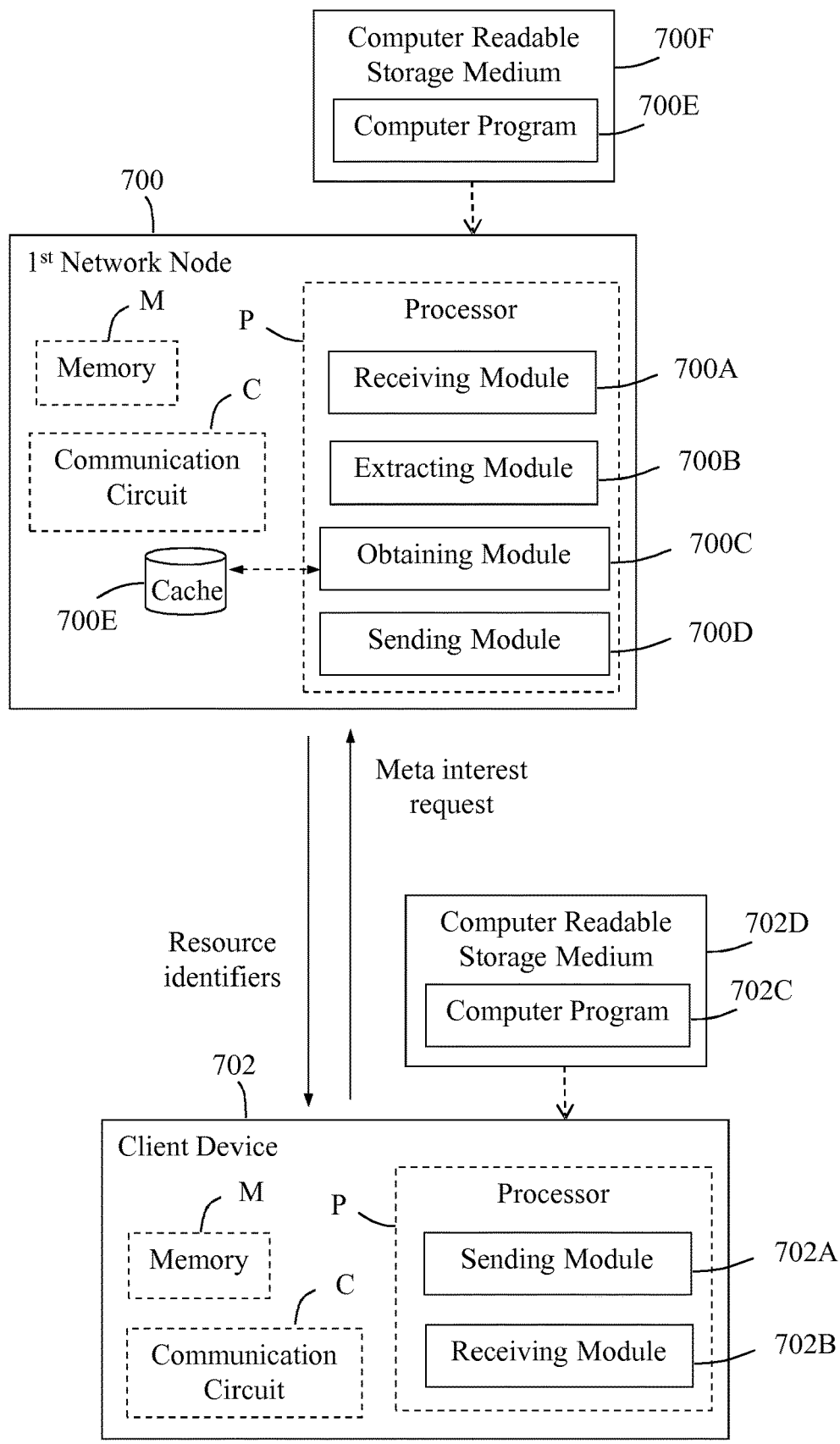
FIG. 7 is a block diagram illustrating a first network node and a client device in more detail, according to further possible embodiments.

The block diagram in FIG. 7 illustrates a detailed but non-limiting example of how a first network node 700 and a client device 702, respectively, may be structured to bring about the above-described solution and embodiments thereof. In this figure, the first network node 700 and the client device 702 may be configured to operate according to any of the examples and embodiments of employing the solution as described herein, where appropriate. Each of the first network node 700 and the client device 702 is shown to comprise a processor "P", a memory "M" and a communication circuit "C" with suitable equipment for sending and receiving messages in the manner described herein.

The communication circuit C in each of the first network node 700 and the client device 702 thus comprises equipment configured for communication with each other using a suitable protocol for the communication depending on the implementation. The solution is however not limited to any specific types of messages or protocols. As a practical but non-limiting example, the messages described herein including the sending of the meta interest request to the control node 700 and the returning of the resource identifiers to the client device 702, may be communicated by means of the Hyper Text Transfer Protocol, HTTP, or the File Transfer Protocol, FTP.

The first network node 700 is, e.g. by means of modules, units or the like, configured or arranged to perform at least some of the actions of the flow chart in FIG. 3 as follows. Further, the client device 702 is, e.g. by means of modules, units or the like, operative or arranged to perform at least some of the actions of the flow chart in FIG. 4 as follows.

The first network node 700 is arranged to enable acquisition and delivery of a resource to a client device 702 in a communications network. The first network node 700 comprises a memory M and a processor P, the memory M containing instructions executable by the processor P such that the first network node 700 is operative as follows. The first network node 700 is configured to receive from the client device 702 a meta interest request indicating an interest for a wanted resource that can be acquired over the communications network. This operation may be performed by a receiving module 700A in the first network node 700, as described above for action 300. The receiving module 700A could alternatively be named a request handling module.

The first network node 700 is further configured to extract from the meta interest request one or more filter parameters related to desirable characteristics of the wanted resource. This operation may be performed by an extracting module 700B in the first network node 700, as described above for action 302. The extracting module 700B could alternatively be named a logic module or a reading module.

The first network node 700 is further configured to obtain identifiers of resources available in the communications network, based on the one or more filter parameters. This operation may be performed by an obtaining module 700C in the first network node 700, as described above for action 306. The obtaining module 700C could alternatively be named a retrieving module or a fetching module.

The first network node 700 is further configured to send the obtained identifiers of resources to the client device 702 in response to the received meta interest request. This operation may be performed by a sending module 700D in the first network node 700, as described above for action 308. The sending module 700D could alternatively be named a delivering module or a responding module.

The client device 702 is arranged to enable acquisition of a resource from one or more network nodes 700 in a communications network. The client device 702 comprises a memory M and a processor P, the memory M containing instructions executable by the processor P such that the client device 702 is operative as follows. The client device 702 is configured to send to a first network node 700 a meta interest request indicating an interest for a wanted resource that can be acquired over the communications network, the meta interest request comprising one or more filter parameters related to desirable characteristics of the wanted resource. This operation may be performed by a sending module 702A in the client device 702, as described above for action 402. The sending module 702A could alternatively be named a requesting module or a retrieving module.

The client device 702 is further configured to receive from the first network node 700 identifiers of resources that match the one or more filter parameters, in response to the sent meta interest request. This operation may be performed by a receiving module 702B in the client device 702, as described above for action 404.

Figure 7A:
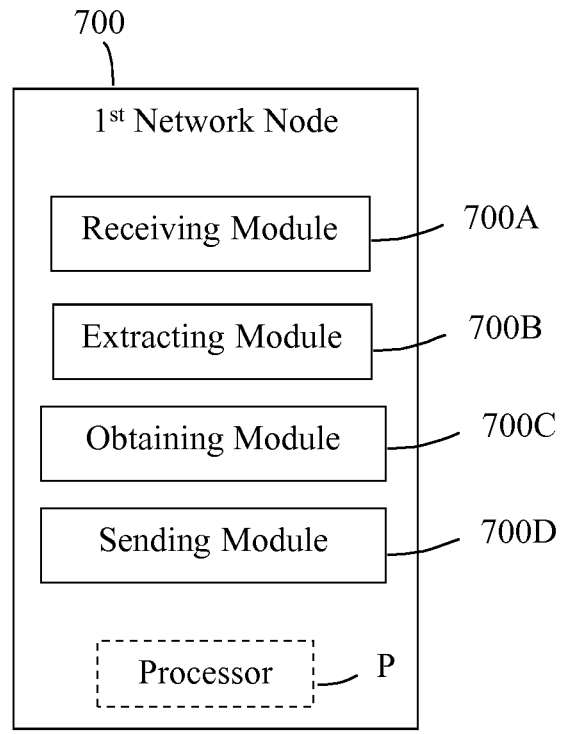
FIG. 7A is a block diagram illustrating another example of how a first network node and a client device may be configured, according to further possible embodiments.
Figure 7A:
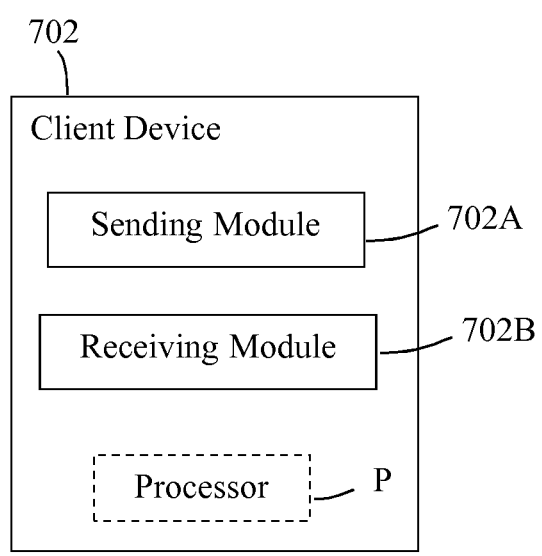

Another example of how the first network node 700 and the client device 702 may be configured is schematically shown in the block diagram of FIG. 7A. In this example, the first network node 700 comprises the functional modules 700A-700D and a processor P, the modules 700A-700E being configured to operate in the manner described above with reference to FIGS. 3 and 5. Further, the network element 702 comprises the functional modules 702A-702B and a processor P, the modules 702A-702B being configured to operate in the manner described above with reference to FIGS. 4 and 5.

Each of FIGS. 7 and 7A further illustrates a system comprising both the first network node 700 and the client device 702, the first network node 700 and the client device 702 being operative as described above.

It should be noted that FIG. 7 illustrates various functional modules in the control node 700 and the network element 702, respectively, and the skilled person is able to implement these functional modules in practice using suitable software and hardware equipment. Thus, the solution is generally not limited to the shown structures of the control node 700 and the network element 702, and the functional modules therein may be configured to operate according to any of the features, examples and embodiments described in this disclosure, where appropriate.

The functional modules 700A-D and 702A-B described above may be implemented in the first network node 700 and the client device 702, respectively, by means of program modules of a respective computer program comprising code means which, when run by the processor P causes the first network node 700 and the client device 702 to perform the above-described actions and procedures. Each processor P may comprise a single Central Processing Unit (CPU), or could comprise two or more processing units. For example, each processor P may include a general purpose microprocessor, an instruction set processor and/or related chips sets and/or a special purpose microprocessor such as an Application Specific Integrated Circuit (ASIC). Each processor P may also comprise a storage for caching purposes.

Each computer program may be carried by a computer program product in each of the first network node 700 and the client device 702 in the form of a memory having a computer readable medium and being connected to the processor P. The computer program product or memory M in each of the first network node 700 and the client device 702 thus comprises a computer readable medium on which the computer program is stored e.g. in the form of computer program modules or the like. For example, the memory M in each node 700, 702 may be a flash memory, a Random-Access Memory (RAM), a Read-Only Memory (ROM) or an Electrically Erasable Programmable ROM (EEPROM), and the program modules could in alternative embodiments be distributed on different computer program products in the form of memories within the respective first network node 700 and client device 702.

The solution described herein may be implemented in each of the first network node 700 and the client device 702 by a computer program 700E, 702C comprising instructions which, when executed on at least one processor, cause the at least one processor to carry out the actions according to any of the above embodiments and examples, where appropriate. The solution may also be implemented at each of the first network node 700 and the client device 702 in a computer readable storage medium 700F, 702D comprising instructions which, when executed on the first network node 700 and the client device 702, cause the first network node 700 and the client device 702 to carry out the actions according to the above respective embodiments, where appropriate.

In conclusion, advantages that may be achieved by employing the solution and its embodiments described herein includes the following.

A) A resource can be easily requested and acquired by means of a limited amount of communication e.g. in an NDN network in which ICN is employed, which means that no specific supplier of the resource needs to be specified in the request.

B) The user is not required to know and specify a particular resource in the meta interest request that is sent to a communications network. He/she is able to just request for any resource that has certain characteristics without knowing which resource(s) that would be.

C) It is not required to develop a separate protocol for resource discovery and content search in ICN, and a regular existing ICN request may be utilized for the procedure described herein.

D) The desired resource may be found and acquired from a network node that is located relatively close to the requesting client device, e.g. as controlled by the above-described parameter maximum number of hops, which may thus reduce both the communication path and latency involved.

While the solution has been described with reference to specific exemplifying embodiments, the description is generally only intended to illustrate the inventive concept and should not be taken as limiting the scope of the solution. For example, the terms "communications network", "network node", "client device", "resource", "meta interest request", "electronic media" and "network resource" have been used throughout this disclosure, although any other corresponding entities, functions, and/or parameters could also be used having the features and characteristics described here. The solution is defined by the appended claims.

The invention claimed is:

1. A method performed by a first network node for enabling acquisition and delivery of a resource to a client device in a communications network, the method comprising:
receiving from the client device a meta interest request indicating an interest for a wanted resource that can be acquired over the communications network,
extracting from the meta interest request one or more filter parameters related to desirable characteristics of the wanted resource,
obtaining identifiers of resources available in the communications network that match the one or more filter parameters, wherein obtaining the identifiers of resources comprises forwarding the received meta interest request to at least one second network node and receiving from the at least one second network node one or more of said identifiers of resources, wherein the at least one second network node is/are determined based on at least one of the group consisting of:
a maximum number of hops indicated in the meta interest request or based on a predefined default maximum number of hops; and
a maximum number of hops which is set based on any of: current load on the communications network, type of the wanted resource, and type of said client device, and
sending the obtained identifiers of resources to the client device in response to the received meta interest request.

2. The method according to claim 1, wherein the meta interest request has a reserved name indicating that the meta interest request should be forwarded to the at least one second network node.

3. The method according to claim 1, wherein the wanted resource comprises at least one of the group consisting of:
electronic media and the one or more filter parameters indicate one or more of: content provider, type of media, format or resolution, genre, country of origin, cost for acquisition, and playback duration; and a network resource and the one or more filter parameters indicate one or more of: network resource provider, type of network resource, performance, and duration of access to the network resource.

4. The method according to claim 3, wherein obtaining the identifiers of resources comprises checking whether any electronic media in a cache of the first network node matches the one or more filter parameters.

5. The method according to claim 1, wherein the communications network is a Named Data Network, NDN, employing Information-Centric networking, ICN.

6. A first network node arranged to enable acquisition and delivery of a resource to a client device in a communications network, wherein the first network node is configured to:
   receive from the client device a meta interest request indicating an interest for a wanted resource that can be acquired over the communications network,
   extract from the meta interest request one or more filter parameters related to desirable characteristics of the wanted resource,
   obtain identifiers of resources available in the communications network that match the one or more filter parameters, wherein obtaining the identifiers of resources comprises forwarding the received meta interest request to at least one second network node and receiving from the at least one second network node one or more of said identifiers of resources, wherein the at least one second network node is/are determined based on at least one of the group consisting of:
      a maximum number of hops indicated in the meta interest request or based on a predefined default maximum number of hops; and
      a maximum number of hops which is set based on any of: current load on the communications network, type of the wanted resource, and type of said client device, and
   send the obtained identifiers of resources to the client device in response to the received meta interest request.

7. The first network node according to claim 6, wherein the meta interest request has a reserved name indicating that the meta interest request should be forwarded to the at least one second network node.

8. The first network node according to claim 6, wherein the wanted resource comprises at least one of the group consisting of:
   electronic media and the one or more filter parameters indicate one or more of: content provider, type of media, format or resolution, genre, country of origin, cost for acquisition, and playback duration; and
   a network resource and the one or more filter parameters indicate one or more of: network resource provider, type of network resource, performance, and duration of access to the network resource.

9. The first network node according to claim 8, wherein the first network node is configured to obtain the identifiers of resources by checking whether any electronic media in a cache of the first network node matches the one or more filter parameters.

10. The first network node according to claim 6, wherein the communications network is a Named Data Network, NDN, configured to employ Information-Centric networking, ICN.

11. A method performed by a client device for enabling acquisition of a resource from one or more network nodes in a communications network, the method comprising:

sending to a first network node a meta interest request indicating an interest for a wanted resource that can be acquired over the communications network, the meta interest request comprising one or more filter parameters related to desirable characteristics of the wanted resource, and wherein the meta interest request indicates a maximum number of hops for the first network node to traverse for identifiers of resources, and
receiving from the first network node identifiers of resources that match the one or more filter parameters, in response to the sent meta interest request, wherein at least a portion of the identifiers of resources are from a second node based on the meta interest request.

12. The method according to claim 11, wherein the wanted resource comprises at least one of the group consisting of:
   electronic media and the one or more filter parameters indicate one or more of: content provider, type of media, format or resolution, genre, country of origin, cost for acquisition, and playback duration; and
   a network resource and the one or more filter parameters indicate one or more of: network resource provider, type of network resource, performance, and duration of access to the network resource.

13. The method according to claim 11, wherein the communications network is a Named Data Network, NDN, employing Information-Centric networking, ICN.

14. A client device arranged to enable acquisition of a resource from one or more network nodes in a communications network, wherein the client device is configured to:
   send to a first network node a meta interest request indicating an interest for a wanted resource that can be acquired over the communications network, the meta interest request comprising one or more filter parameters related to desirable characteristics of the wanted resource, and wherein the meta interest request indicates a maximum number of hops for the first network node to traverse for identifiers of resources, and
   receive from the first network node identifiers of resources that match the one or more filter parameters, in response to the sent meta interest request, wherein at least a portion of the identifiers of resources are from a second node based on the meta interest request.

15. The client device according to claim 14, wherein the one or more filter parameters are set in response to input received from a user or from an application in the client device.

16. The client device according to claim 15, wherein the meta interest request is sent to the first network node when triggered by the user or by the application.

17. The client device according to claim 14, wherein the wanted resource comprises at least one of the group consisting of:
   electronic media and the one or more filter parameters indicate one or more of: content provider, type of media, format or resolution, genre, country of origin, cost for acquisition, and playback duration; and
   a network resource and the one or more filter parameters indicate one or more of: network resource provider, type of network resource, performance, and duration of access to the network resource.

* * * * *